(12) United States Patent
Wahl

(10) Patent No.: US 11,858,203 B2
(45) Date of Patent: Jan. 2, 2024

(54) DEVICE AND METHOD FOR GENERATIVE MANUFACTURING OF AN OBJECT MADE UP OF A PLURALITY OF CROSS SECTIONS AND THREE-DIMENSIONAL OBJECT

(71) Applicant: Robert Bosch GmbH, Stuttgart (DE)

(72) Inventor: Ruben Wahl, Kernen (DE)

(73) Assignee: ROBERT BOSCH GMBH, Stuttgart (DE)

(*) Notice: Subject to any disclaimer, the term of this patent is extended or adjusted under 35 U.S.C. 154(b) by 326 days.

(21) Appl. No.: 16/651,995

(22) PCT Filed: Oct. 31, 2018

(86) PCT No.: PCT/EP2018/079780
§ 371 (c)(1),
(2) Date: Mar. 27, 2020

(87) PCT Pub. No.: WO2019/091839
PCT Pub. Date: May 16, 2019

(65) Prior Publication Data
US 2020/0247049 A1 Aug. 6, 2020

(30) Foreign Application Priority Data
Nov. 8, 2017 (DE) .................. 10 2017 219 795.1

(51) Int. Cl.
*B29C 64/153* (2017.01)
*B33Y 10/00* (2015.01)
(Continued)

(52) U.S. Cl.
CPC ............ *B29C 64/153* (2017.08); *B22F 12/30* (2021.01); *B29C 64/214* (2017.08);
(Continued)

(58) Field of Classification Search
CPC ... B29C 64/245; B29C 64/153; B29C 64/393; B33Y 10/00; B22F 10/20
See application file for complete search history.

(56) References Cited

U.S. PATENT DOCUMENTS 7,227,618 B1 * 6/2007 Bi .......................... B33Y 30/00
355/71
2016/0161872 A1 * 6/2016 Orrock ................. G03G 15/225
264/484
(Continued)

FOREIGN PATENT DOCUMENTS

WO     2005089463 A2      9/2005
WO     WO-2016084348 A1 * 6/2016  ......... B29C 67/0074
WO     WO-2016084367 A1 * 6/2016  ......... B29C 67/0074

OTHER PUBLICATIONS

International Search Report for PCT/EP2018/079780, dated Jan. 14, 2019.

*Primary Examiner* — Joseph S Del Sole
*Assistant Examiner* — Margaret B Hayes
(74) *Attorney, Agent, or Firm* — NORTON ROSE FULBRIGHT US LLP; Gerard A. Messina

(57) ABSTRACT

A device for generative manufacturing of an object made up of a plurality of cross sections. The device includes an application unit including an application surface for applying a sinterable material as a reproduction of one of the cross sections of the object on the application surface, a substrate for accommodating the reproduction from the first application surface, and a curing unit for curing the reproduction made of the sinterable material on the substrate, the curing unit being situated spatially separated from the application unit.

9 Claims, 3 Drawing Sheets

(51) Int. Cl.
  *B33Y 30/00* (2015.01)
  *B33Y 50/02* (2015.01)
  *B29C 64/214* (2017.01)
  *B29C 64/245* (2017.01)
  *B29C 64/393* (2017.01)
  *B22F 12/30* (2021.01)
  *B22F 10/20* (2021.01)

(52) U.S. Cl.
  CPC .......... *B29C 64/245* (2017.08); *B29C 64/393* (2017.08); *B33Y 10/00* (2014.12); *B33Y 30/00* (2014.12); *B33Y 50/02* (2014.12); *B22F 10/20* (2021.01)

(56) References Cited

U.S. PATENT DOCUMENTS

| | | | | |
|---|---|---|---|---|
| 2016/0200084 A1* | 7/2016 | Hays | ...................... | B33Y 10/00 |
| | | | | 156/62.2 |
| 2016/0339542 A1* | 11/2016 | Paetz | ...................... | B22F 10/30 |
| 2016/0368055 A1* | 12/2016 | Swaminathan | ......... | B22F 12/63 |
| 2017/0157849 A1* | 6/2017 | Mook | .................... | B33Y 10/00 |
| 2017/0232673 A1* | 8/2017 | Usami | ................ | B29C 35/0288 |
| | | | | 156/64 |

\* cited by examiner

DEVICE AND METHOD FOR GENERATIVE MANUFACTURING OF AN OBJECT MADE UP OF A PLURALITY OF CROSS SECTIONS AND THREE-DIMENSIONAL OBJECT

FIELD

The present invention is directed to a device and a method for generative manufacturing of an object.

BACKGROUND INFORMATION

A 3D printer, which is designed to manufacture a three-dimensional object from a sinterable powder, is described in PCT Application No. WO 2005/089463A2.

SUMMARY

An example device for generative manufacturing of an object made up of a plurality of cross sections, an example method for generative manufacturing of an object made up of a plurality of cross sections, and an example three-dimensional object manufactured by the example method are provided in accordance with the present invention.

The example device for generative manufacturing of an object made up of a plurality of cross sections includes an application unit including an application surface for applying a sinterable material as a reproduction of one of the cross sections of the object to the application surface. Furthermore, the device includes a substrate for accommodating the reproduction from the first application surface. Furthermore, the device includes a curing unit for curing the reproduction made of the sinterable material on the substrate, the curing unit being situated spatially separated from the application unit.

Generative manufacturing may also be understood as additive manufacturing or rapid prototyping, three-dimensional components being produced, for example, in succession, from individual layers or cross sections of the component. For this purpose, a three-dimensional object or component to be produced is typically modeled with computer assistance and divided into individual parallel disks or cross sections of a defined thickness. The data, in particular on the geometrical dimensions of the cross sections, are relayed to the device, which sequentially produces the reproductions of these cross sections. An application unit may be understood as a unit, using which the sinterable material may be applied to the application surface in accordance with the dimensions of one of the cross sections of the component to be manufactured. In this case, arbitrary two-dimensional shapes may be produced on the application surface. A height of the arbitrary two-dimensional shapes may be set within a defined range. The application surface may be designed in this case as a planar surface. In an alternative specific embodiment, the application surface may be designed as an outer surface of a cylindrical drum. The reproduction thus resulting of one of the cross sections of the object to be produced is subsequently transferred to the substrate. A substrate may be understood in this case as a receptacle unit for accommodating the reproduction. The substrate may accommodate a first reproduction of a cross section of the object to be produced in this case. All further reproductions of the cross sections of the object to be produced are transferred onto the previously accommodated reproduction, so that the substrate finally bears all reproductions of the cross sections of the object to be produced. A curing unit may be understood in this case as a unit for solidifying the sinterable material. It may be understood to include thermal units, for example, furnaces, heating coils, and/or infrared radiators. Furthermore, it may be understood to include optical units, which cure the sinterable material, for example, with the aid of ultraviolet light or ultraviolet laser radiation and/or visible and/or infrared laser radiation. The curing unit is not situated directly at the application unit in this case, but rather spatially separated from the application unit. Such a device, in which the curing unit and application unit are arranged separately from one another, has the advantage that the sinterable material is not negatively affected by the curing unit during the application on the application surface. A particularly robust manufacturing process may be ensured in this way. Furthermore, a defined layer thickness may be produced significantly faster by this device than by other devices for additive manufacturing. Moreover, thermoplastics and thermosetting material may thus be processed.

Advantageous refinements on and improvements of the example device according to the present invention are possible by way of the measures described herein.

It is furthermore advantageous if the example device includes at least one further application unit having at least one further application surface for applying the sinterable material as a reproduction of one of the cross sections of the object to the further application surface, the at least one further application unit being situated spatially separated from the application unit and from the curing unit. A manufacturing speed may advantageously be increased by the at least one further application unit. By arranging the at least one further application unit spatially separated from the curing unit, an application of the sinterable material to the application unit may take place undisturbed by thermal and/or optical influences of the curing unit. Furthermore, a further application unit has the advantage that individual mechanical components of the application units are protected, since the mechanical stress is distributed onto both application units with uniform manufacturing speed. Furthermore, an application of multiple different materials in one print is possible in this way (multi-material). For example, materials such as polycaprolactam (PA6), polyoxymethylene (POM), and/or polyethylene (PE) may be used. The materials may be designed to be both conductive and nonconductive in this case.

In accordance with the present invention, the substrate and the curing unit may be movable in relation to one another. Furthermore, it is advantageous if the substrate and the application unit are movable in relation to one another. Moreover, it is advantageous if the substrate and the further application unit are movable in relation to one another. Thus, hereby in this way, for example, a reproduction applied by the application unit may be accommodated by the substrate and cured by the curing unit and subsequently a further reproduction may be transferred from the further application unit to the already cured reproduction. In the meantime, the application unit may apply the next reproduction to be applied to the application surface. The manufacturing speed may be further increased in this way.

Moreover, in accordance with the present invention, it is advantageous if the application surface and/or the further application surface is electrostatically chargeable. Thus, hereby, an application of the sinterable material to the application surface may be assisted and improved.

Furthermore, it may be advantageous in accordance with the present invention if the device includes an exposure unit for at least in certain areas eliminating an electrostatic charge on the application surface and/or the further application surface. The exposure unit may be situated directly at the application unit in this case. A further exposure unit may be situated directly at the further application unit in this case. Due to the elimination in certain areas of the electrostatic charge on the application surface and/or the further application surface, the sinterable material may only remain adhering at the points on the application surface and/or the further application surface at which the electrostatic charge is eliminated. In this way, the reproduction to be applied to the application surface and/or the further application surface may be structured very accurately. The reproductions of the individual cross sections of the component to be produced may thus be transferred precisely.

It is furthermore advantageous in accordance with the present invention if the substrate is electrostatically chargeable. Thus, hereby, in this way, the transfer of the reproduction from the application surface and/or the further application surface to the substrate is assisted. Transfer defects may be avoided in this way, whereby the quality of the component to be manufactured increases overall.

It is furthermore advantageous if the application unit and/or the further application unit is designed to dispense an electrostatically chargeable, sinterable powder and/or an electrostatically chargeable, sinterable liquid onto the application surface and/or the further application surface. Thus, hereby, in this way, the application of the sinterable material is facilitated and an increased level of variability with respect to a material selection is achieved. Possible materials are polyamides, polyolefins, acrylates, epoxies, and/or methacrylates.

Furthermore, it is advantageous if the device includes a leveling unit for leveling the sinterable material on the substrate and/or for removing excess sinterable material from the substrate. Thus, hereby, in this way, very homogeneous and level surfaces of the individual reproductions to be manufactured of the cross sections of the component to be produced are achieved. Furthermore, a compacting and thus optimized density may be produced in the component and a porosity in the component to be produced may be reduced. A leveling unit may be situated in this case, for example, spatially separated from the application unit and the curing unit between the application unit and the curing unit. A further leveling unit may also be situated spatially separated from the curing unit and the further application unit between the curing unit and the further application unit.

The above-mentioned advantages also apply accordingly to a method for generative manufacturing of an object made up of a plurality of cross sections, in particular to a device according to one of the above-described embodiments.

In this case, the method includes a step of applying a sinterable material as a reproduction of one of the cross sections of the object to an application surface by an application unit or a further application unit. Furthermore, the method includes a step of accommodating the reproduction from the application surface to a substrate, and a step of curing the reproduction made of the sinterable material on the substrate by a curing unit situated spatially separated from the application unit and from the further application unit. The method is distinguished in that a step of a relative movement between the substrate and the curing unit takes place between the steps of accommodating and curing, in such a way that the substrate and the curing unit are opposite to one another after ending the relative movement. In this way, the step of applying and the step of curing may be executed on different units and at different positions in or on the device. A high manufacturing speed may be achieved in this way, since the application unit may apply the sinterable material to the application surface undisturbed by the curing unit while the reproduction previously transferred to the substrate is cured at the curing unit.

Furthermore, it is advantageous if prior to the step or during the step of applying, the application surface or the further application surface is electrostatically charged and the electrostatic charge is at least regionally in certain areas eliminated by an exposure unit. Thus, hereby, an indirect structuring, which corresponds to a two-dimensional geometric design of the reproduction to be applied made of the sinterable material, may be carried out in this way on the application surface and/or the further application surface. The sinterable material may thus be applied in a structured manner to the application surface, whereby very precise reproductions of the cross sections of the component to be produced may be created.

It is furthermore advantageous if the substrate is electrically charged prior to the step or during the step of accommodating. Thus, hereby, in this way, the precise transfer of the reproduction made of the sinterable material from the application surface or the further application surface to the substrate is facilitated. The quality of the component to be produced may be further increased in this way.

The approach described here furthermore provides a three-dimensional object, which is made up of a plurality of cross sections and/or different materials, in particular manufactured as per the method according to the above-described embodiments. Such a three-dimensional object has the advantage that it may be manufactured easily, on the one hand, and may have a nearly arbitrary geometry, on the other hand. Furthermore, the three-dimensional object may be manufactured from various sinterable materials having different mechanical, thermal, optical, and/or electronic properties. The three-dimensional object may be designed nearly arbitrarily in this way in its appearance, in particular its optical and/or haptic appearance.

The approach described here furthermore provides a control unit, which is designed to activate the device according to one of the above-described embodiments in order to carry out a method according to one of the above-described exemplary embodiments. For this purpose, the control unit may include at least one processing unit for processing signals or data, at least one storage unit for storing signals or data, at least one interface to a sensor or a sensor element or an actuator for reading in sensor signals from the sensor or for outputting control signals to the actuator, and/or at least one communication interface for reading in or outputting data which are embedded in a communication protocol. The processing unit may be, for example, a signal processor, a microcontroller, or the like, the storage unit being a flash memory, an EPROM, or a magnetic storage unit.

The communication interface may be designed to read in or output data in a wireless and/or wired manner, a communication interface which may read in or output data via wires may read in these data, for example, electrically or optically from a corresponding data transmission line or output these data into a corresponding data transmission line.

In accordance with the present invention, a computer program product or computer program is also advantageous, having program code which may be stored on a machine-readable, in particular nonvolatile, carrier or storage medium such as a semiconductor memory, a hard drive memory, or an optical memory and is used to carry out, implement, and/or activate the steps of the method according to any one of the above-described specific embodiments, in particular when the program product or program is executed on a computer or a device according to one of the above-described specific embodiments.

Exemplary embodiments of the present invention are illustrated in the figures and explained in greater detail below.

DETAILED DESCRIPTION OF EXAMPLE EMBODIMENTS

Figure 1:
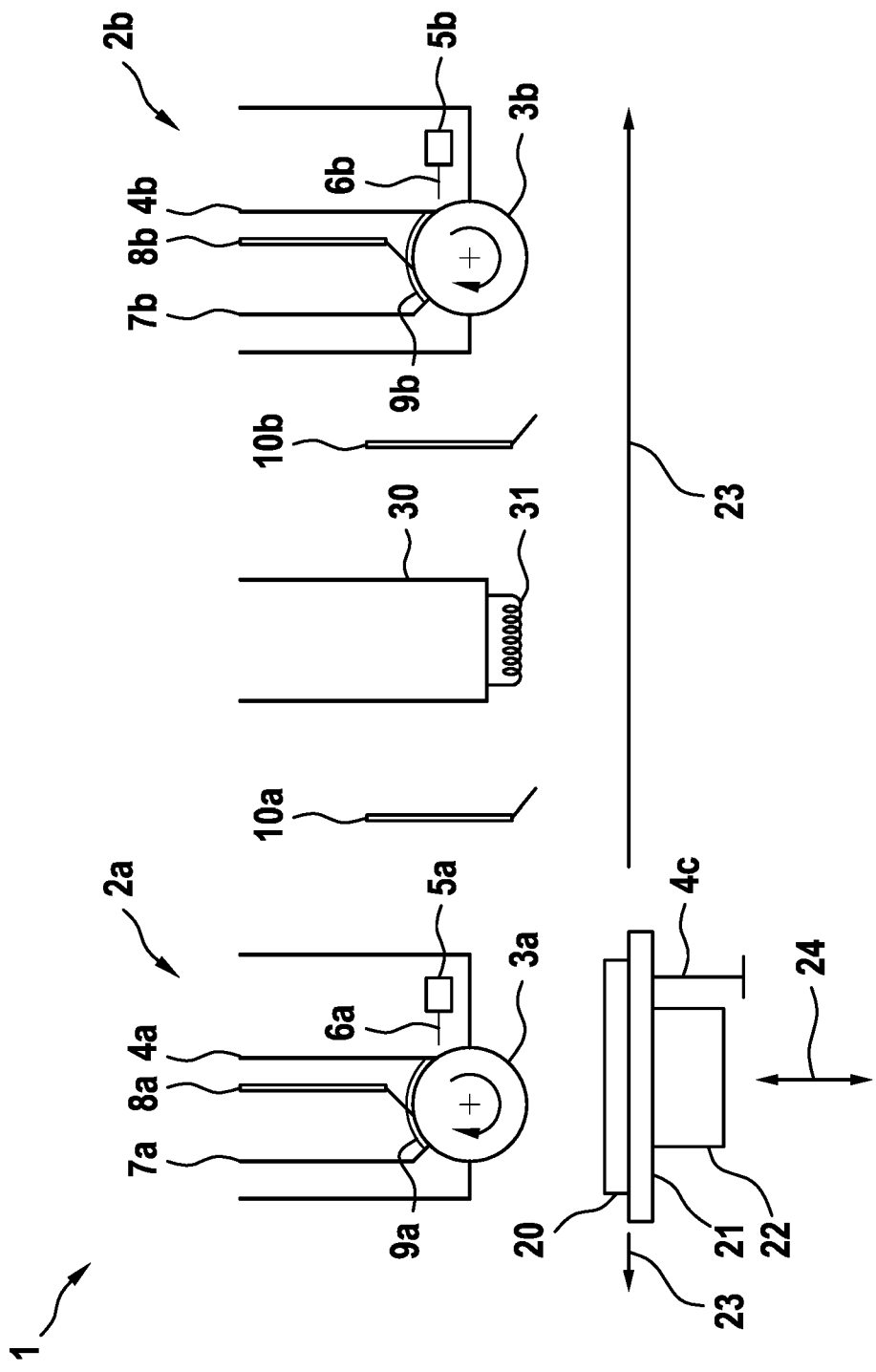
FIG. 1 shows a schematic view of a device for generative manufacturing of an object made up of a plurality of cross sections according to one exemplary embodiment.

In accordance with the present invention, a device 1 for generative manufacturing of an object made up of a plurality of cross sections according to one exemplary embodiment is shown in FIG. 1. The device includes an application unit 2a, a curing unit 30 situated adjacent thereto and spatially separated, and a substrate 20. Device 1 may optionally include a further application unit 2b identical to application unit 2a. Application unit 2b is situated spatially separated from both application unit 2a and from curing unit 30, preferably adjacent to curing unit 30. Application unit 2a includes an application surface 3a formed as a cylindrical drum. Application surface 3a is electrostatically charged via an electrical charging unit 4a. An exposure unit 5a may expose application surface 3a at points or at least in certain areas with the aid of a laser beam 6a, which may be deflected in two dimensions, and thus eliminate an electrostatic charge on application surface 3a at the exposed points. A two-dimensional structure, namely a reproduction of one of the cross sections of the object to be produced, may be reproduced on a charge distribution on application surface 3a in this way. After the exposure by exposure unit 5a, sinterable material 9a is applied to application surface 3a by a material supply 7a. Sinterable material 9a may be electrostatically chargeable in this case. Sinterable material 9a only adheres at the exposed points on application surface 3a. An excess of sinterable material 9a may be removed from application surface 3a by a leveling unit designed as a doctor blade 8a. The leveling unit may also, alternatively or additionally, be situated as a further doctor blade 10a, 10b spatially separated between application unit 2a and curing unit 30 and/or between application unit 2b and curing unit 30. Application surface 3a, which is designed as a cylindrical drum, advantageously rotates away clockwise below the particular units in this case. The reproduction of a cross section of the object to be produced is transferred from application surface 3a to substrate 20. Substrate 20 is mounted by a substrate holder 21, substrate holder 21 being movable by a drive 22 in all three spatial directions. To assist the transfer of the reproduction from application surface 3a to substrate 20, substrate 20 or substrate holder 21 may in turn be electrostatically charged by a further electrical charging unit 4c. After the reproduction made of sinterable material 9a has been transferred to substrate 20, substrate 20 is moved by drive 22 from a position below application unit 2a to a position below curing unit 30. Curing unit 30 includes a heating wire 31, which heats up in such a way that the reproduction made of sinterable material 9a cures and solidifies on substrate 20.

In an alternative specific embodiment, it may be provided that the curing unit is designed as an optical curing unit. This may also be understood as an infrared light source, for example, which heats curable material 91 by irradiation using infrared light and thus cures it. The infrared light source may be designed as an infrared laser in this case. Furthermore, an optical curing unit may also be such that ultraviolet or visible laser light cross-links sinterable material 9a in such a way that it cures and solidifies.

After the curing of the reproduction made of sinterable material 9a on substrate 20, the next reproduction made of sinterable material 9a may be transferred onto substrate 20. This may again be carried out, for example, in application unit 2a, in which application surface 3a was charged, exposed, and provided with sinterable material 9a in the meantime.

Alternatively, this next step may also be carried out in further application unit 2b. In this case, further application surface 3b was in the meantime charged via further charging unit 4b, exposed by further exposure unit 5b and further laser beam 6b, and provided with further sinterable material 9b by further material supply 7b. An excess of further sinterable material 9b may optionally have been removed by further doctor blade 8b from further application surface 3b.

For this purpose, substrate 20 including substrate holder 21 was moved by drive 22 accordingly below application unit 2a or below further application unit 2b, for example, along an axis indicated by double arrow 23 in relation to application unit 2a, further application unit 2b, and curing unit 30. After transfer of the further reproduction onto substrate 20 or onto the reproduction already provided on substrate 20, substrate 20 is moved by drive unit 22 back to the position below curing unit 30 where further reproduction is cured and bonds to the underlying reproduction. As a function of a number of reproductions already transferred to the substrate, substrate holder 21 is moved together with substrate 20 by drive 22 perpendicularly in relation to axis 23. This movement, indicated by double arrow 24, is used to set a distance between substrate 20 or the reproductions already transferred to the substrate and application unit 2a, 2b. These steps of application and curing may be repeated in any order until the object or component to be produced is finished.

The manufacturing speed of device 1 may be significantly increased by the presence of two application units 2a, 2b and a curing unit 30 situated spatially separated therefrom. Depending on a rotational speed of application surface 3a, 3b, designed as a cylindrical drum, and a speed of drive 22, for example, embodied as a high-agility axis system, very high application speeds may be achieved and thus the manufacturing speed of the method may be further increased.

Figure 2:
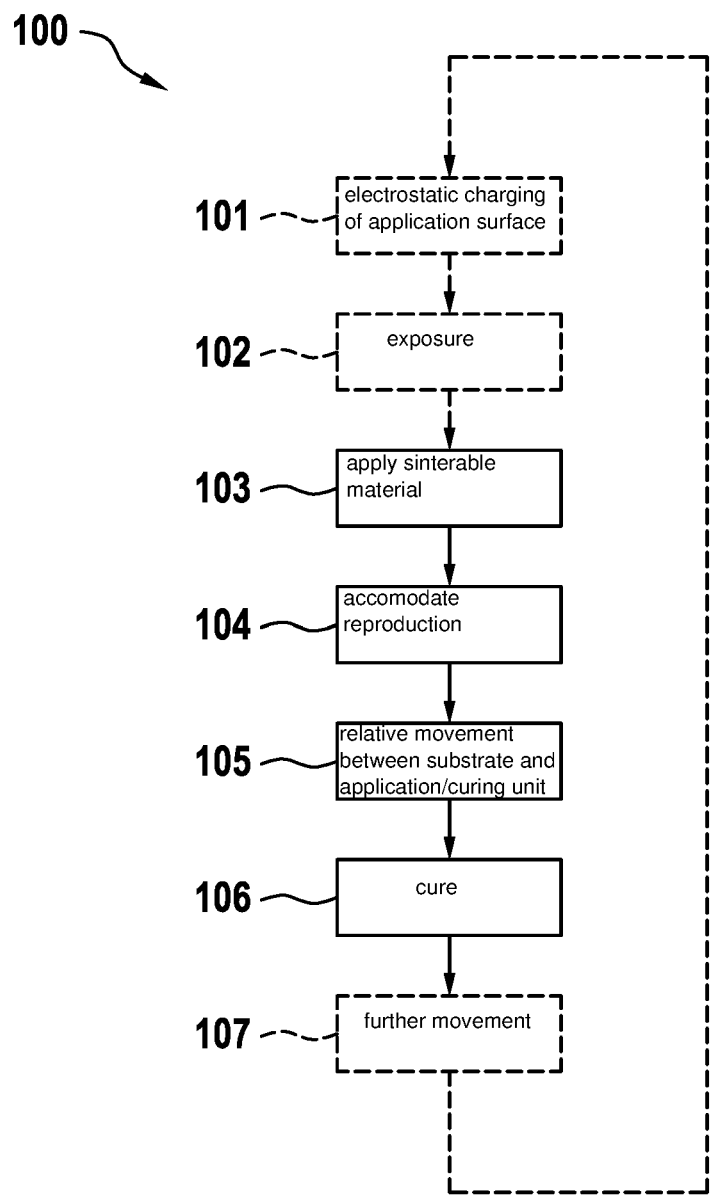
FIG. 2 shows a flow chart of a method for generative manufacturing of an object made up of a plurality of cross sections according to one exemplary embodiment.

FIG. 2 shows a flow chart of a method 100 for generative manufacturing of an object made up of a plurality of cross sections. In an application step 103, a sinterable material 9a, 9b is applied as a reproduction of one of the cross sections of the object to an application surface 3a, 3b by an application unit 2a or a further application unit 2b. Sinterable material 9a, 9b may be provided in this case as a sinterable powder and/or as a sinterable liquid. Sinterable material 9a may furthermore be electrostatically chargeable. In a following accommodation step, the reproduction is transferred from application surface 2a, 2b onto a substrate 20. Substrate 20 may be electrostatically charged in this case. In a following movement step 105, a relative movement takes place between substrate 20 and application unit 2a, 2b and/or a curing unit 30a, which is situated adjacent to application unit 2a and further application unit 2b. The relative movement takes place in such a way that substrate 20 having the reproduction made of sinterable material 9a, 9b is positioned at a position below curing unit 30. In a following curing step 106, curing of the reproduction made of sinterable material 9a, 9b on substrate 20 is carried out by curing unit 30.

It may optionally be provided that before the step of application 103, a step of electrostatic charging 101 of application surface 3a and/or further application surface 3b is carried out by an electrical charging unit 4a, 4b. It may optionally be provided that after charging step 101 and before application step 103, an exposure step 102 is carried out, during which an electrostatic charge on application surface 3a and/or on further application surface 3b is at least in certain areas eliminated by an exposure unit 5a, 5b, in order to electrostatically structure application surface 3a and/or further application surface 3b. Due to this electrostatic structuring, in the next step, namely application step 103, sinterable material 9a, 9b is applied only at the points on application surface 3a and/or further application surface 3b at which the electrical charge was previously eliminated by exposure.

After the step of curing 106, a further movement step 107 may optionally be carried out, during which substrate 20 including substrate holder 21 is moved by drive 22 from the position below curing unit 30 to a position below application unit 2a or further application unit 2b, so that the method may be repeated until the reproduction of the last cross section of the object or component to be produced is applied and cured.

Figure 3:
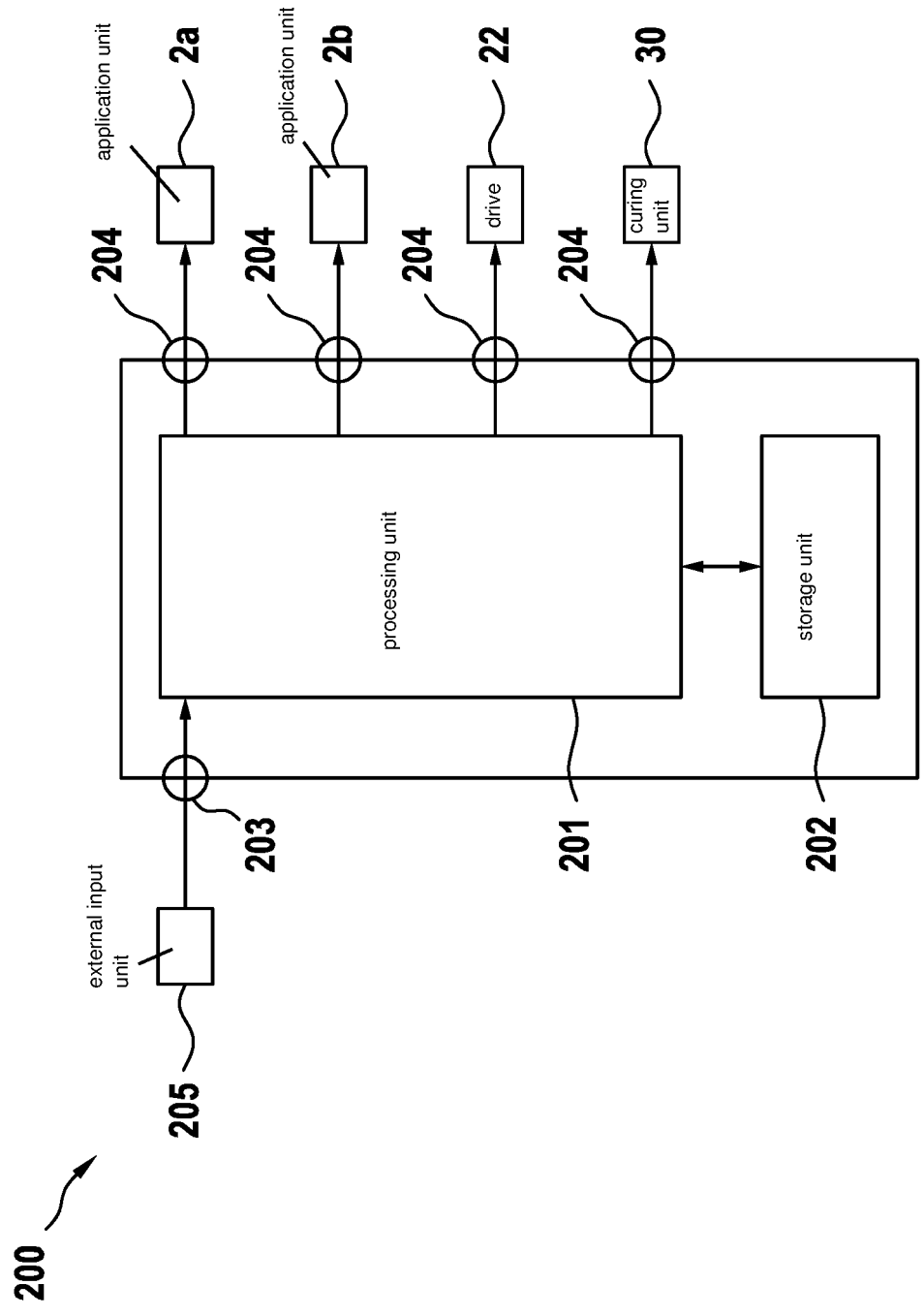
FIG. 3 shows a schematic view of a control unit according to one exemplary embodiment.

FIG. 3 shows a schematic view of a control unit 200, which is designed to carry out method 100 according to the exemplary embodiment from FIG. 2. Control unit 200 includes a processing unit 201 and a storage unit 202. Furthermore, control unit 200 includes an input interface 203, via which it has a signal connection to an external input unit 205, designed as a computer, for example. The geometrical dimensions or data of the individual cross sections of an object to be produced may be transferred via external input unit 205 to processing unit 201. These data may be buffered in storage unit 202. Processing unit 201 computes therefrom, in consideration of pre-definable framework parameters, an instruction for how device 1 or application unit 2a, further application unit 2b, drive 22, and/or curing unit 30 are to be activated. These data are provided or transferred from processing unit 201 via output interfaces 204 to the particular units.

What is claimed is:

1. A method for generative manufacturing of an object made up of a plurality of cross sections and materials, the method comprising:

computer modeling a three-dimensional object or component, which is divided into individual parallel disks or cross sections of a defined thickness, wherein data on geometrical dimensions of the cross sections, are provided for sequentially producing reproductions of the cross sections;

applying a sinterable material as a reproduction of one of the cross sections of the object on an application surface using an application unit and a further application unit;

accommodating the reproduction from the application surface on a substrate; and curing the reproduction made of the sinterable material on the substrate by a curing unit situated adjacent the application unit and spatially separated from the application unit and from the further application unit;

moving the substrate and the curing unit relative to one another between the accommodating step and the curing step so that the substrate and the curing unit are opposite to one another after ending the relative movement;

wherein the application surface of the application unit is formed as a cylindrical drum, wherein prior to or during the applying, the application surface and the further application surface is electrostatically charged and the electrostatic charge is at least in certain areas eliminated by an exposure unit, wherein the exposure unit is configured to expose the application surface and the further application surface at points or at least in certain areas with a laser beam, which is deflectable in dimensions, so as to provide an electrostatic structure by eliminating an electrostatic charge on the application surface and the further application surface at the exposed points, so that a multi-dimensional structure, which is a reproduction of one of the cross sections of the object to be produced, is reproduced on a charge distribution on the application surface and the further application surface, and wherein due to the electrostatic structure, in the applying, the sinterable material is applied only at points on the application surface at which an electrical charge was previously eliminated by exposure by the exposure unit, wherein the application unit is spatially separated from the further application unit and from the curing unit, and wherein the application unit and the further application unit are each adjacent to the curing unit, wherein the relative movement takes place so that the substrate having the reproduction made of the sinterable material is positioned at a position below the curing unit, wherein after the curing, a further movement is performed, during which the substrate including a substrate holder is moved by the drive from a position below the curing unit to a position below application unit or the further application unit, so that the method may be repeated until the reproduction of the last cross section of the object is applied and cured, and wherein the sinterable material includes an electrostatically chargeable, sinterable powder.

2. The method as recited in claim 1, wherein the substrate is electrically charged prior to or during the accommodating step.

3. The method as recited in claim 1, wherein the application unit includes the application surface, wherein the application unit and the further application unit are used by the method, wherein the further application unit includes a further application surface, wherein the sinterable material is applied to the application surface of the application unit as the reproduction of the one of the cross sections of the object, further comprising:

applying a further sinterable material as a reproduction of another of the cross sections of the object on the further application surface using the further application unit, wherein the application unit is situated spatially separated from the further application unit.

4. The method as recited in claim 1, wherein the substrate and the curing unit are moveable in relation to one another, and/or the substrate and the application unit are moveable in relation to one another, and/or the substrate and the further application unit are movable in relation to one another.

5. The method as recited in claim 1, wherein the application surface and/or the further application surface is electrostatically chargeable.

6. The method as recited in claim 5, further comprising:
using an exposure unit to, at least in certain areas, eliminate an electrostatic charge on the application surface and/or the further application surface.

7. The method as recited in claim 1, wherein the substrate is electrostatically chargeable.

8. The method as recited in claim 1, further comprising:
leveling the sinterable material on the substrate and/or removing an excess of the sinterable material from the substrate using a leveling unit.

9. The method as recited in claim 1, wherein the object is a three-dimensional object made up of the plurality of cross sections.

* * * * *